United States Patent [19]
Kato et al.

[11] Patent Number: 5,936,658
[45] Date of Patent: Aug. 10, 1999

[54] IMAGE FORMING APPARATUS HAVING TWO MODES FOR INPUTTING USER IDENTIFICATION NUMBER

[75] Inventors: Tomokazu Kato, Toyokawa; Kazuhiro Araki, Okazaki, both of Japan

[73] Assignee: Minolta Co., Ltd., Osaka, Japan

[21] Appl. No.: 08/948,360

[22] Filed: Oct. 10, 1997

[30] Foreign Application Priority Data

Oct. 11, 1996 [JP] Japan .................................. 8-269691

[51] Int. Cl.⁶ .................................................. G03G 21/04
[52] U.S. Cl. ........................... 347/247; 347/237; 399/80; 399/81; 399/82; 399/366
[58] Field of Search .................................... 347/247, 237; 399/80, 81, 82

[56] References Cited

U.S. PATENT DOCUMENTS

| 4,702,589 | 10/1987 | Ito . | |
|---|---|---|---|
| 4,780,806 | 10/1988 | Wada et al. ............................. | 364/146 |
| 4,811,053 | 3/1989 | Ito et al. . | |
| 4,975,734 | 12/1990 | Mishima ................................... | 355/70 |

FOREIGN PATENT DOCUMENTS 05045960  2/1993  Japan .

*Primary Examiner*—N. Le
*Assistant Examiner*—Hai C. Pham
*Attorney, Agent, or Firm*—McDermott, Will & Emery

[57] ABSTRACT

An image forming apparatus, which judges whether image forming is permitted when a pre-registered identification number is received, includes an input mode setting unit for setting either a first mode or a second mode, where the first mode deals with a numerical string received by an input receiving unit as a first identification number, and the second mode deals with the numerical string received by the input receiving unit as a second identification number. The image forming apparatus also performs display control to have a display unit not display the received numerical string in the case where the first mode is set and to have a display unit display the received numerical string in the case where the second mode is set.

13 Claims, 20 Drawing Sheets

Fig. 19

SECTION REGISTRATION MONITOR TABLE

| SECTION NUMBER | CODE NUMBER | REGISTRATION |
|---|---|---|
| 1 | 1 1 1 1 | ○ |
| 2 | 1 2 3 4 | ○ |
| 3 | – – – – | × |
| ⋮ | ⋮ | ⋮ |
| 1 0 0 0 | 2 2 2 2 | ○ |
| 1 0 0 1 | – – – – | × |
| ⋮ | ⋮ | ⋮ |
| 9 9 9 9 | 0 0 0 1 | ○ |
| TOTAL NUMBER OF REGISTERED SECTIONS | | 1 3 5 |

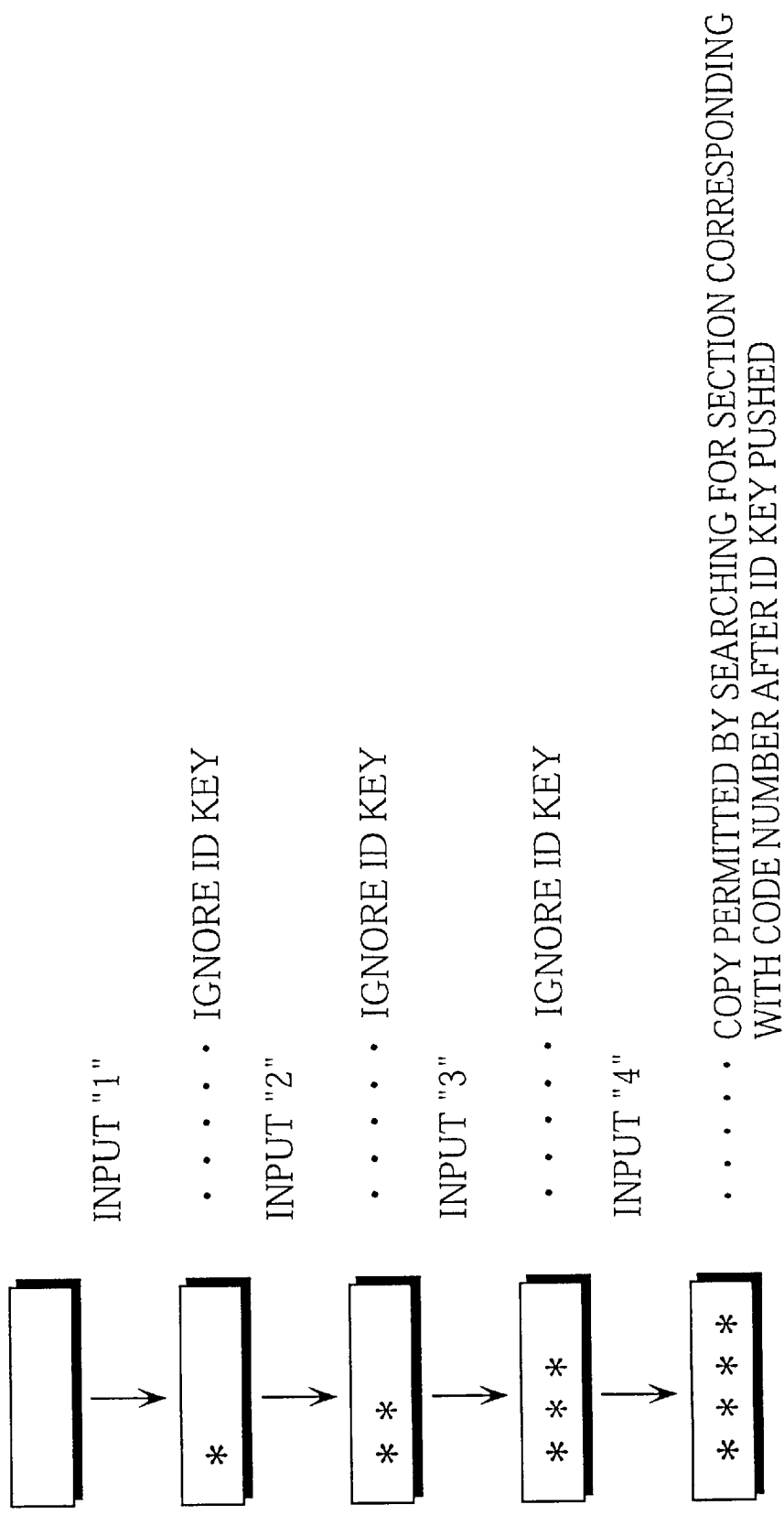

IMAGE FORMING APPARATUS HAVING TWO MODES FOR INPUTTING USER IDENTIFICATION NUMBER

BACKGROUND OF INVENTION

(1) Field of the Invention

The present invention relates to an image forming apparatus which permits a user to form images by inputting a code identifying the section to which the user belongs, making it easy to monitor how many copies have made by each section.

(2) Description of the Prior Art

An image forming apparatus, in particular a copying machine, is often shared by users who belong to different sections of an organization such as a firm.

In such case, the number of copies made by each section to which users belong is stored and monitored. When a user makes copies, the copying machine judges whether the user belongs to a preregistered section by referring to code numbers which are exclusively assigned to each section and are stored beforehand in a memory as a table with the code numbers corresponding with section numbers and addresses.

If a code number inputted from a control panel is a code number registered in the table, the user is judged to belong to the section corresponding with the inputted code number and is permitted to make copies. The total number of copies made by the user is then added to the number stored in a memory area assigned to the section and is monitored as necessary.

The inputted code number is generally displayed as coded characters on a liquid crystal display in a control panel to prevent outsiders from seeing the code number. If copies are made by inputting a code number as described above, the reliability of the monitoring of the number of copies made by each section can be ensured.

To ensure reliability, it is normal to have all of the digits in a code number inputted. However, when a section number assigned to a section is directly used as the code number, it can be very troublesome for users to input all of the digits assigned to code numbers regardless of the number of digits in the section number. Also, there can be cases where section numbers are known publicly and so do not need to be kept confidential, with it then being desirable to display the input result on a display to enable users to judge whether the input operation is correct.

For instance, when a section with section number "1" uses its section number as its code number and the code numbers are all four-digit numbers, "0001" needs to be inputted.

When a number which is easily inputted incorrectly- "3098", for instance-is assigned as the section number and is used as the code number, it is desirable to confirm on the display whether "3098" has been inputted correctly or whether an incorrect input, such as "3089", has been made. However, this confirmation cannot be performed when the number is inputted as a code number.

SUMMARY OF THE INVENTION

The object of the present invention is to provide an image forming apparatus which can ensure security by inputting code numbers, but which can also avoid the problems associated with the inputting of code numbers described above.

The object above is achieved by an image forming apparatus which permits a user to form images by inputting a preregistered identification number and which includes: an input unit from which a numerical string is inputted; a display unit which displays the inputted numerical string; input mode setting unit which sets either the first mode in which the inputted numerical string is used as the first identification number or the second mode in which the inputted numerical string is used as the second identification number; and a display control which has the display unit not display the inputted numerical string when the first mode is set and display the inputted numerical string when the second mode is set. The image forming apparatus of the present invention has such construction so that, in the case where an identification number is used as a code number, the first identification number is used as the code number in the first mode and the inputted first identification number is not displayed on the display unit, thereby maintaining confidentiality. In the case where a section number which is known publicly is used as an identification number, the second identification number is used in the second mode and the inputted second identification number is displayed, thereby enabling the inputted number to be easily confirmed.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 19 shows a registration monitor table.

FIG. 22 shows an input process in the code number input mode.

DESCRIPTION OF THE PREFERRED EMBODIMENT

Figure 1:
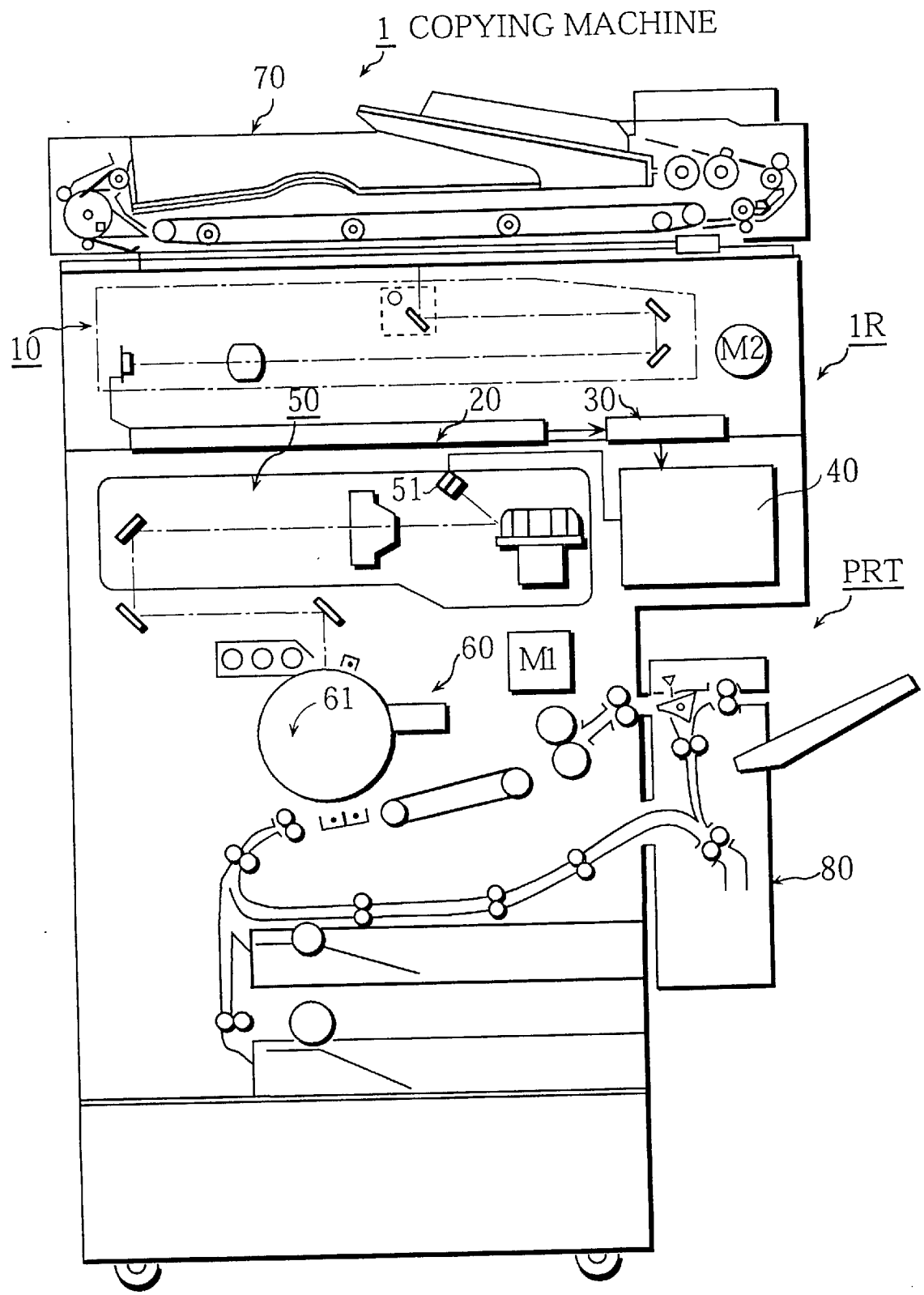
FIG. 1 is a simplified cross-sectional view showing the overall structure of a copying machine of an embodiment of the present invention.

The following is a detailed explanation of an embodiment of the present invention, with reference to the drawings. FIG. 1 is a simplified cross-sectional view showing the overall structure of a digital copying machine 1 to which the present invention is applied.

The copying machine 1 mainly comprises a scanning system 10, an image signal processing unit 20, a memory unit 30, a print processing unit 40, a laser optical system 50, an image forming system 60, a document transport unit 70, a re-feeding/reverse unit 80, and an operation panel 90.

The scanning system 10 reads a document and transforms it into an image signal. The image signal processing unit 20 processes the image signal transmitted from the scanning system 10. The memory unit 30 performs control such as whether the inputted image data from the image signal processing unit 20 is to be outputted directly to a printer PRT or is to be stored in a memory. The print processing unit 40 drives a semiconductor laser 51 based on the image data outputted from the memory unit 30. The laser optical system 50 guides the laser beam from the semiconductor laser 51 to the exposure position on a photosensitive drum 61. The image forming system 60 develops a latent image formed by the exposure and transfers, fixes, and forms the image onto a paper sheet. The document transport unit 70 transports a document and reverses it, if necessary. The re-feeding/reverse unit 80 directly feeds or reverses and feeds the paper sheet to the transfer position again. The operation panel 90 is mounted on the top of the copying machine body and receives a user's instructions. The operation panel 90 is described in detail below.

Note that an image reading unit IR comprises the scanning system 10 and the image signal processing unit 20, and that the printer PRT comprises the print processing unit 40, the laser optical system 50, and the image forming system 60.

Figure 2:
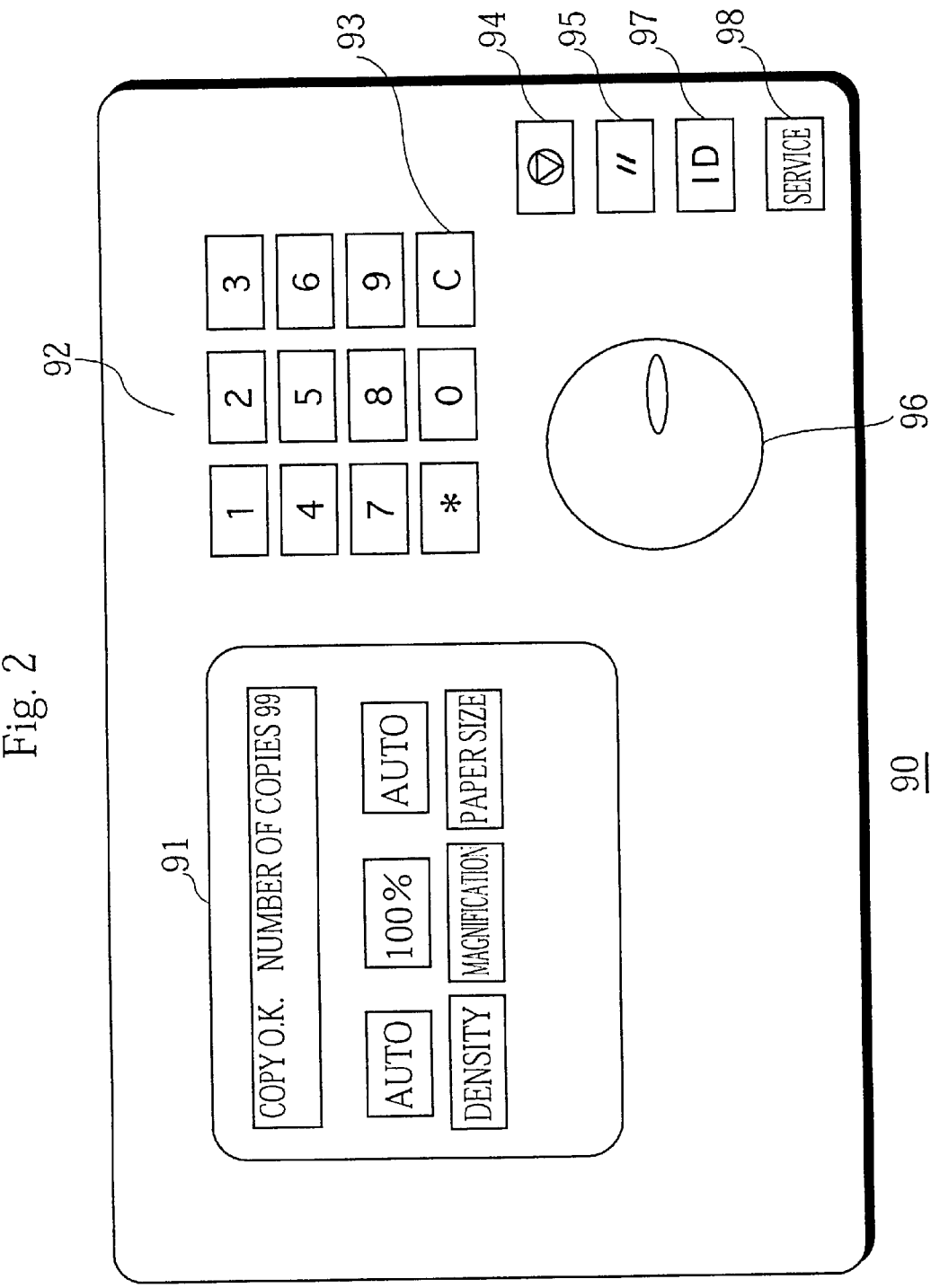
FIG. 2 is a front view of a control panel.

The following is a detailed explanation of the operation panel 90. FIG. 2 is a front view of the operation panel 90. As shown in FIG. 2, the operation panel 90 comprises a liquid crystal touch panel 91, a 10-keypad 92 which is used to input numerical values such as code numbers and section numbers, a clear key 93 which returns a numerical value to a standard value "1", a panel reset key 94 which returns the settings of the copying machine to standard values, a stop key 95 which stops a copying operation, a start key 96 which starts a copying operation, an ID key 97 which is used to set inputted code numbers and section numbers, and a service key 98 which activates liquid crystal images for executing section registration and other operation.

Figure 3:
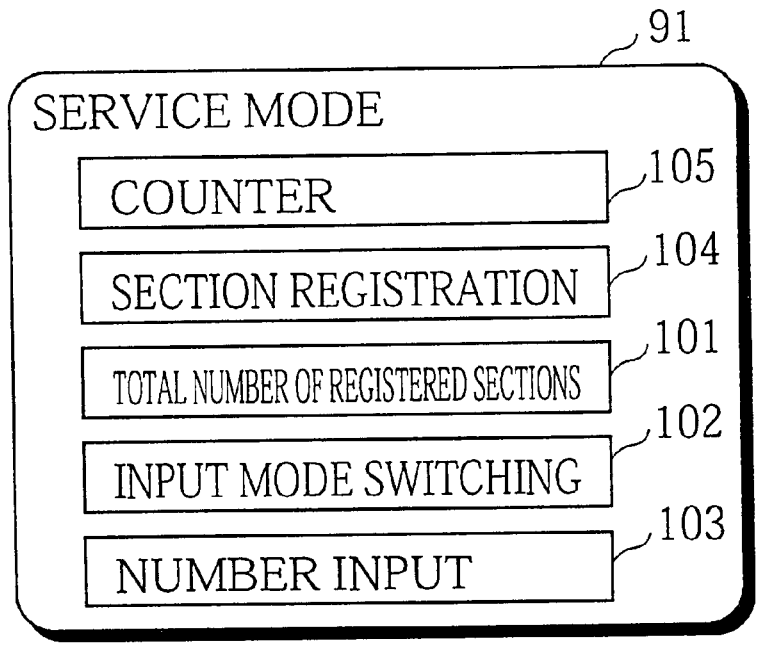
FIG. 3 shows a service mode image.

The liquid crystal touch panel 91 displays an initial image which displays operation states of the copying machine such as the exposure level, the copy magnification, and the paper sheet size, and displays input keys which are used to designate settings such as density and paper size. The liquid crystal touch panel 91 further displays error conditions such as paper jams and a lack of paper in the sheet cassettes. The initial image changes to a service mode image shown in FIG. 3 by pushing the service key 98.

Figure 4:
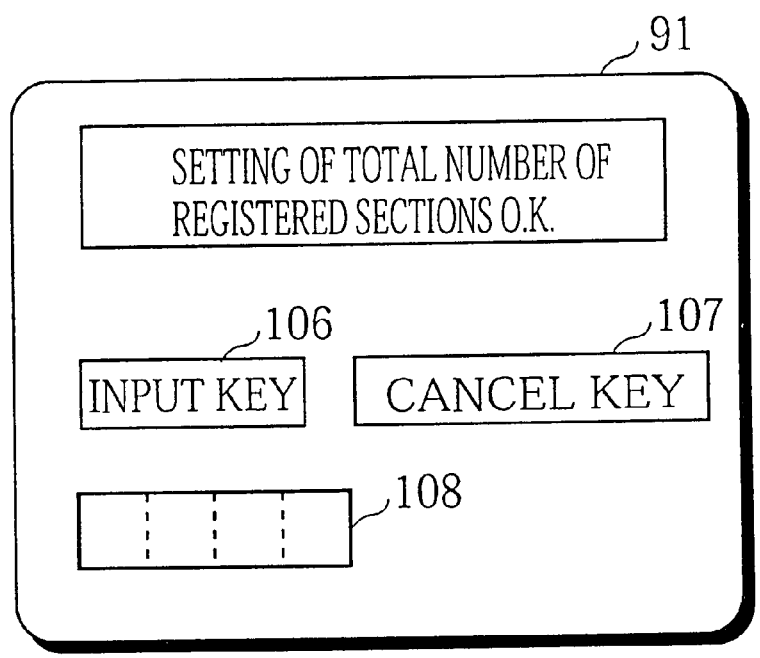
FIG. 4 shows the total number of registered sections input image.
Figure 5:
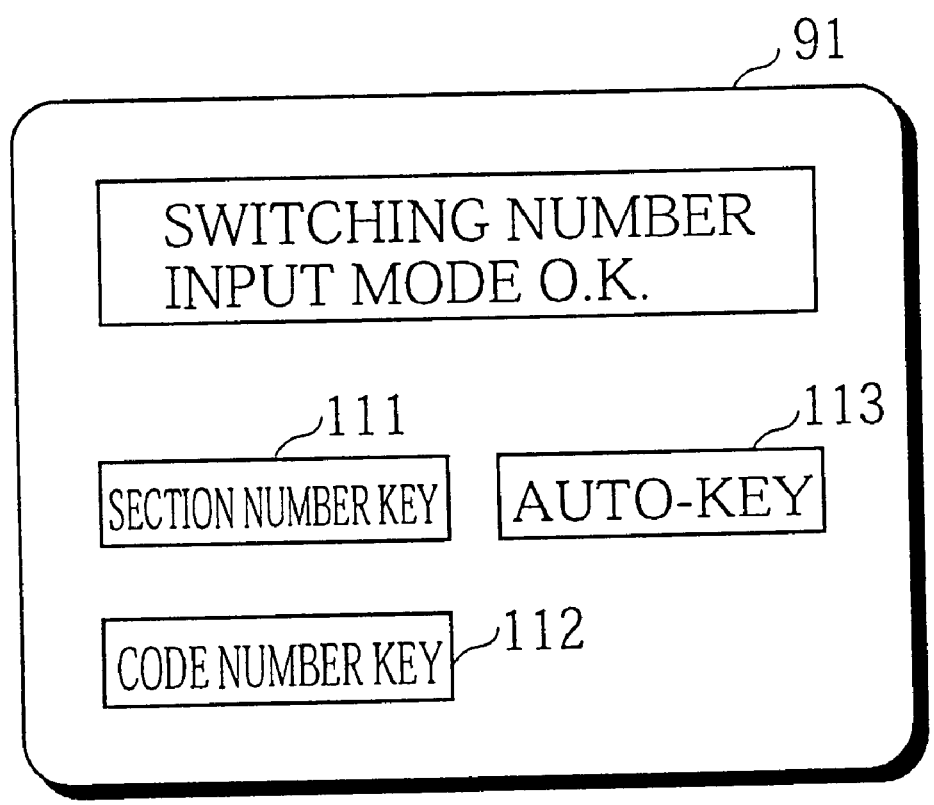
FIG. 5 shows a number input mode switching image.
Figure 6:
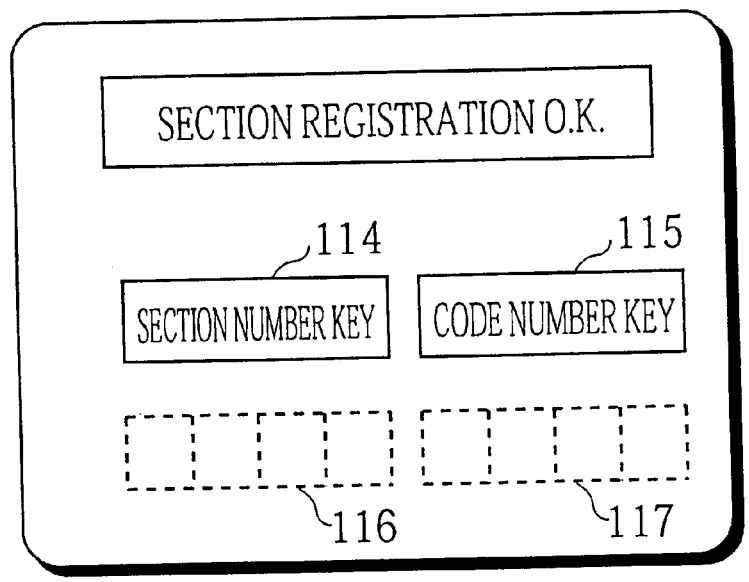
FIG. 6 shows a section registration image.
Figure 7:
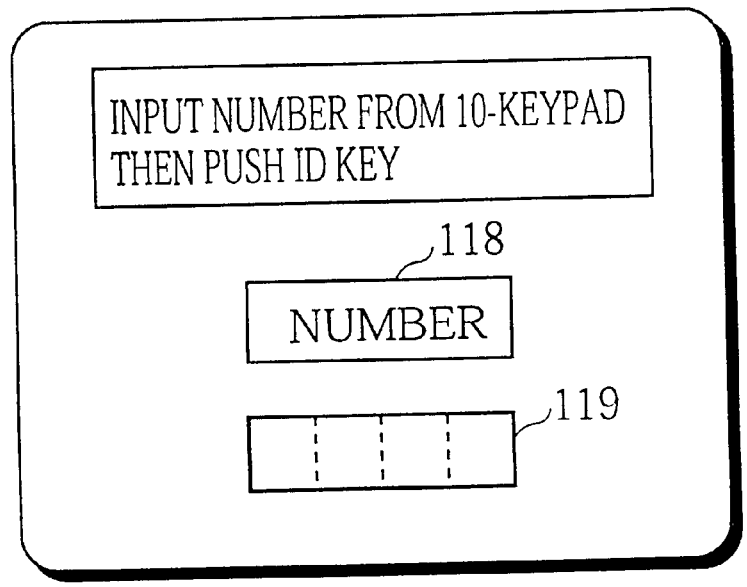
FIG. 7 shows a number input image.

The service mode image has a tree structure. The total number of registered sections input image shown in FIG. 4 is activated if a total number of registered sections input key 101 is touched. The number input mode switching image shown in FIG. 5 is activated if an input mode switching key 102 is touched with predetermined conditions being satisfied. The section registration image shown in FIG. 6 is activated if a section registration key 104 is touched. The number input image shown in FIG. 7 is activated if a number input key 103 is touched. These special display images allow various inputs to be made.

More specifically, when the total number of registered sections input image shown in FIG. 4 is displayed, a planned number of registered sections which use the copying machine can be inputted. When the number input mode switching image shown in FIG. 5 is displayed, either an input mode in which a section number is used as the identification number for judging whether a user is permitted to use the copying machine, or an input mode in which a code number is used can be selected. Alternatively, automatic setting of these modes can be selected. When the section registration image shown in FIG. 6 is displayed, section numbers of sections which use the copying machine 1 and code numbers which are assigned to the sections can be registered. When the number input image shown in FIG. 7 is displayed, a user inputs a section number or a code number according to the input mode to be permitted to make copies using the copying machine 1.

Note that, as a rule, the total number of registered sections input image in FIG. 4, the number input mode switching image in FIG. 5, and the section registration image in FIG. 6 are generally only used when a person in charge changes the settings of the copying machine beforehand. The number input image in FIG. 7 is used when a user actually makes copies.

Figure 8:
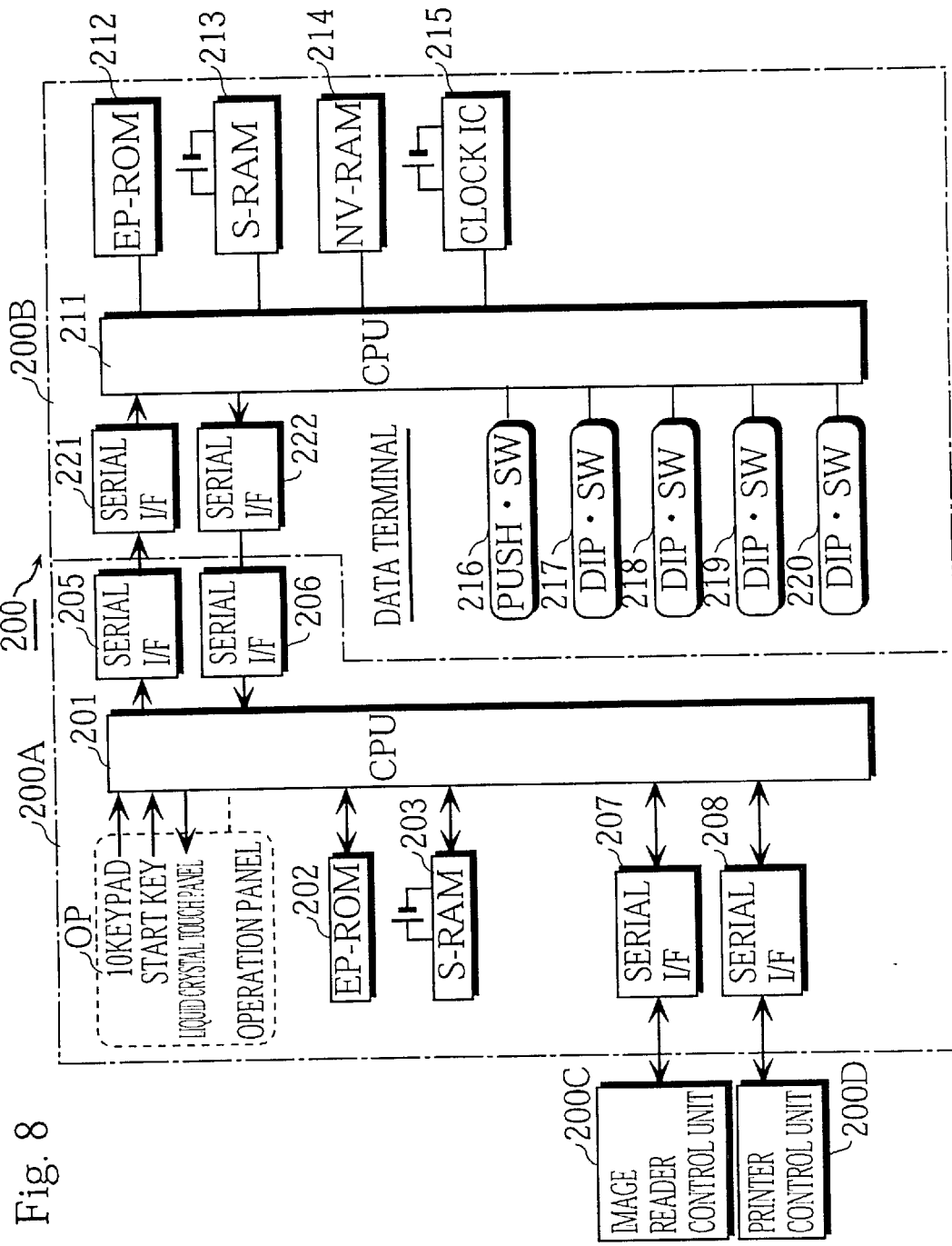
FIG. 8 is a block diagram showing the structure of a control unit in a copying machine.
Figure 9:
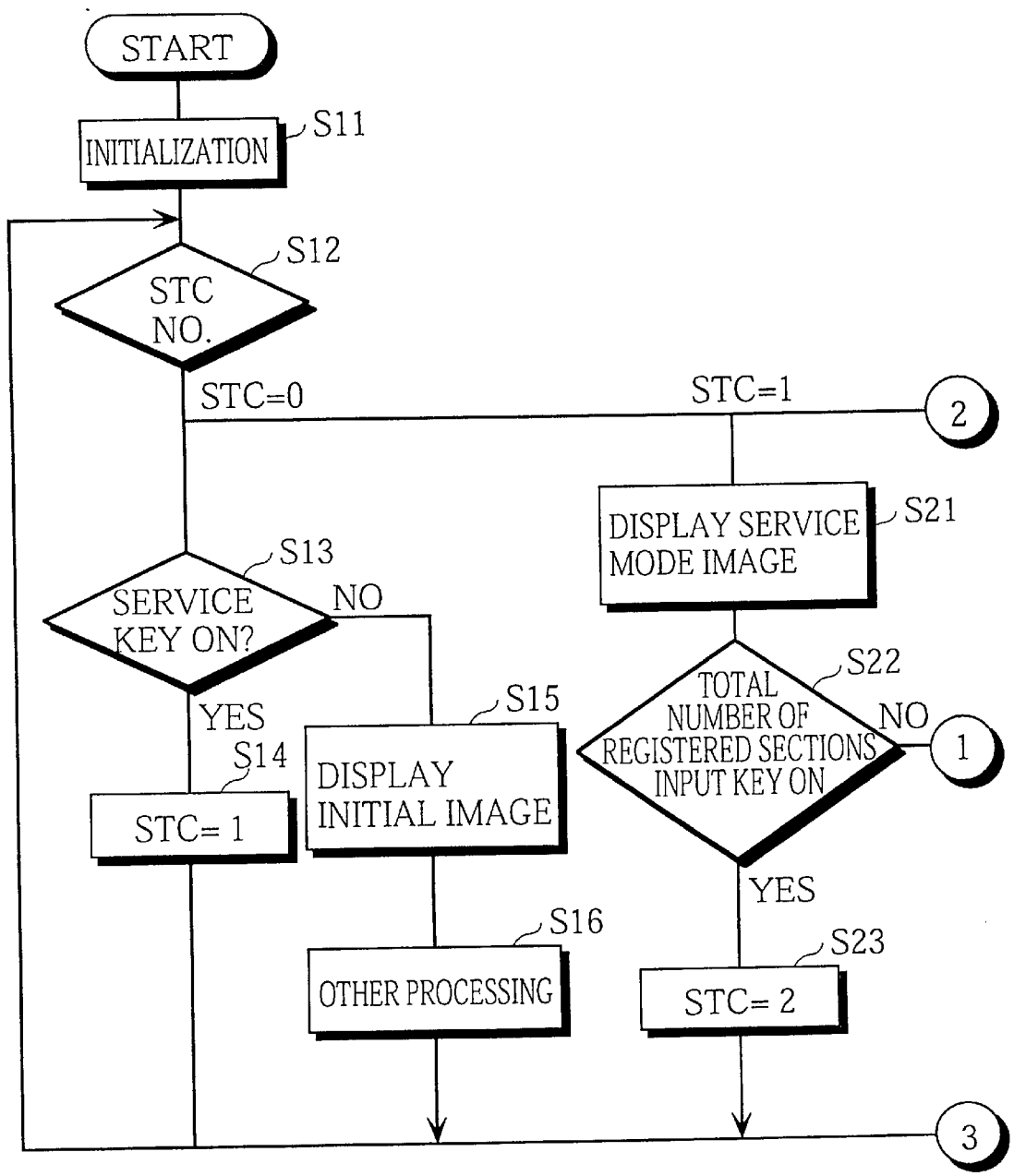
FIGS. 9–16 are flowcharts showing operation of a control unit.
Figure 10:
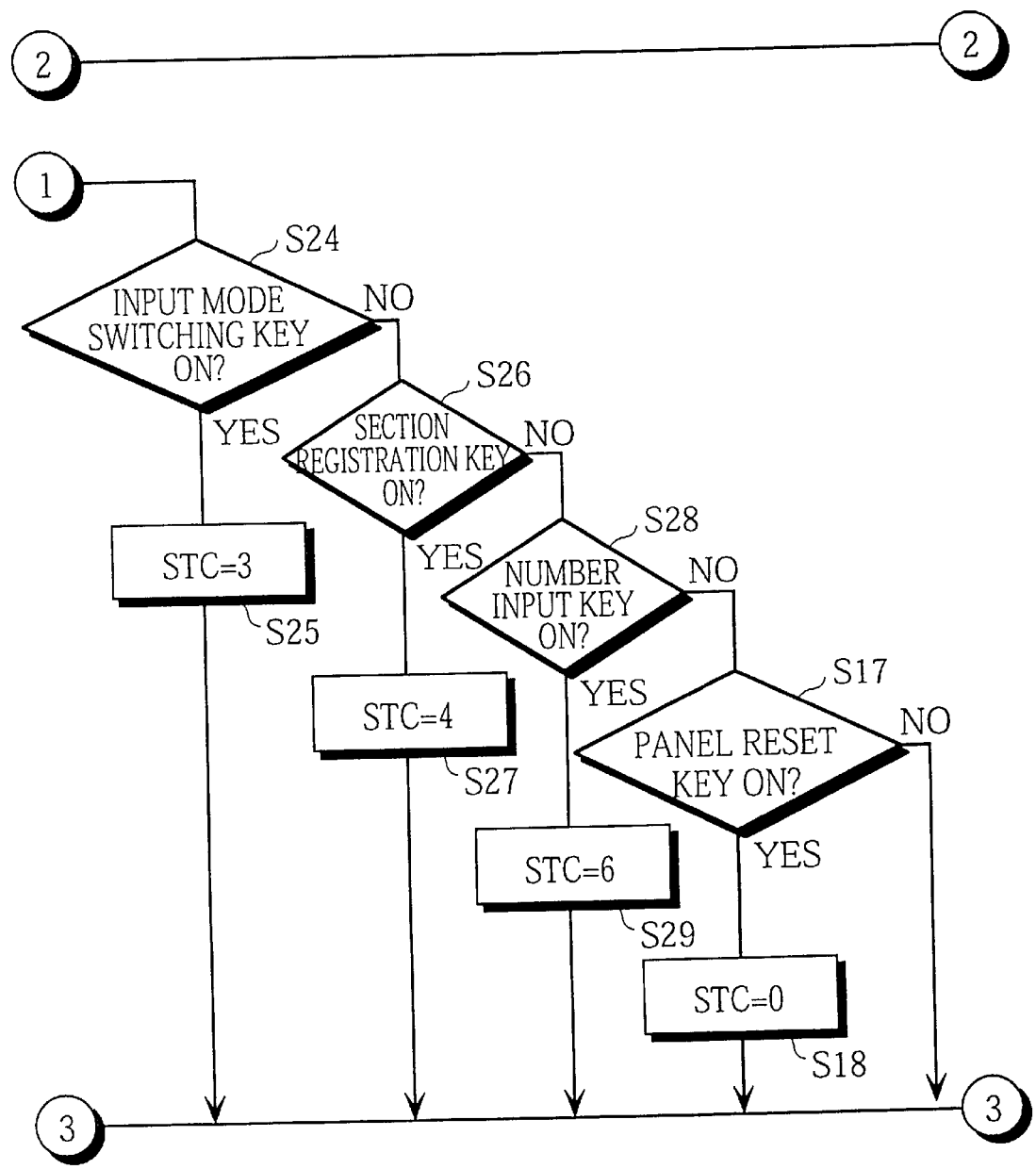

The following is an explanation of the hardware structure of a control system in the copying machine 1. FIG. 8 is a block diagram showing the structure of a control system 200 placed in the copying machine 1. The control system 200 mainly comprises a main control unit 200A for controlling the copying operation of the copying machine 1, a data terminal control unit 200B for monitoring how many copies are made using the copying machine, an image reader control unit 200C for controlling the image reading unit IR, and a printer control unit 200D for controlling the printer PRT.

The main control unit 200A mainly comprises CPU 201 and is provided with an EP-ROM 202 which stores a basic program necessary for controlling the CPU 201, an S-RAM 203 which has a battery-backup and provides a work area for storing instructions from a user and operation states of each unit while the program is executed, serial I/Fs 205 and 206 for communicating with the data terminal control unit 200B, a serial I/F 207 for communicating with the image reader control unit 200C, and a serial I/F 208 for communicating with the printer control unit 200D.

The CPU 201 reads a panel display program for switching a display image in the liquid crystal touch panel 91 provided on the operation panel 90 and has a variety of input images (described later) displayed as necessary.

The CPU 201 transmits information related to copying conditions, which is set from the operation panel 90 while a copying basic image is displayed, to the image reader unit 200C and the printer control unit 200D via the serial I/Fs 207 and 208, respectively. These control units control a read operation and a print operation of a document based on this information.

The printer control unit 200D generates a count request each time one sheet has been printed and transmits the request to the data terminal control unit 200B via the main control unit 200A.

The data terminal control unit 200B mainly comprises CPU 211 and is provided with an EP-ROM 212 which stores a basic program necessary for controlling the CPU 211, an S-RAM 213 which has a battery-backup and has various flags, an NV-RAM 214 which has a registration monitor table (see FIG. 19) for registering and monitoring section numbers and code numbers registered via the operation panel 90, a clock IC 215 which measures time for control purposes, a push switch 216, DIP switches 217 to 220, and serial I/Fs 221 and 222 for communicating with the main control unit 200A.

The CPU 211 controls the registration of section numbers and code numbers and judges whether a copying operation is permitted by receiving a section number or code number inputted from a user, based on the input mode, and searching for an identical number registered in the registration monitor table in the NV-RAM 214. The result is transmitted to the main control unit 200A and the number of copies made by each section corresponding to each section number is counted, based on the count requests transmitted from the printer control unit 200D via the main control unit 200A.

The following is an explanation of each operation performed from the service mode image in the liquid crystal touch panel on the copying machine having the structure described above, with reference to FIGS. 9 to 16.

After initialization (S11) by switching on, a processing program is selected according to the value of a state counter (hereinafter called STC) (S12) and the appropriate processing is carried out.

The STC is set to "0" during initialization and is set to "1" when the service key 98 is pushed (S14). The STC changes to a value from 2 to 7 according to the key which is touched in the service mode image.

The value of STC is "0" after switching on so that the processing is repeated as S13→S15→S16→S12. In this state, the operation panel displays the initial image shown in FIG. 2. Other processing in S16 includes the receiving of copying operations from the initial image and the controlling of copying operations, so that ordinary copying operations can be performed from the initial image. On the other hand, if the service key 98 is pushed with the initial image being displayed, the STC is set to "1" (S14) and the value is maintained unless the panel reset key 94 is pushed.

If the STC is 1, the processing proceeds as S12→S21→S22. In other words, the operation panel displays the service mode image shown in FIG. 3 (S21). If an operator touches a total number of registered sections input key 101 (S22) in this state, the STC is set to 2 (S23). If an input mode switching key 102 is pushed (S24) (hereinafter see FIG. 10), the STC is set to 3 (S25). If a section registration key 104 is pushed (S26), the STC is set to 4 (S27). If a number input key 103 is pushed (S28), the STC is set to 6 (S29). On the other hand, if the panel reset key 94 is pushed while the service mode image is displayed (S17), the STC is reset to 0 (S18) so that the operation panel image returns to the initial image.

If the operator touches the total number of registered sections input key 101 in S22 and the STC is set to 2, the processing proceeds as S12→S30→S31 (see FIG. 11) and the operation panel image changes to the total number of registered sections input image shown in FIG. 4 (S30). If the operator touches an input key 106 in this image (S31), a 4-digit number can be inputted as the number of sections which will be registered from the 10-keypad 92 (S33). The inputted number is displayed on a display part 108 directly under the enter key 106.

After the number input is completed, the ID key 97 is pushed to end the input (S34). The inputted numerical value is set in a predetermined register as a planned number of registered section numbers (S35). Note that the planned number of registered section numbers is the maximum number of sections that can be registered, and is a set number in this apparatus. In the present embodiment, a 4-digit number is assigned to the planned number of registered section numbers so that any number up to 9999 can be set. After the input of the planned number of registered section numbers is completed, the STC is set to 3 in S37 and the system returns to S12.

On the other hand, if a cancel key 107 in the image shown in FIG. 4 is touched (S32), the planned number of registered section numbers is set to 0 (S36) and the STC is set to 3 (S37), with the system returning to S12. If the planned number of registered section numbers is set to 0 as described above, there is no user-defined limit to number of sections which may be registered. If the panel reset key 94 is pushed while the image shown in FIG. 4 is displayed (S90), the STC is set to 0 and the operation panel image returns to the initial image (S91). Note that if the panel reset key is pushed while any of the images shown in FIGS. 5–7 is displayed, the STC is set to 0 and the operation panel image returns to the initial image.

If the input mode switching key 102 is touched in S24 and the planned number of registered section numbers is set, the STC is set to 3. In this state, the processing proceeds to S38 (see FIG. 12) and it is judged whether the planned number of registered section numbers has a set limit (S38). If the planned number of registered section numbers has a set limit, it is judged whether the number exceeds 5000 (S39). In the case of 5001 or more, the number input mode is set to "the section number input mode" (S40) and in the case of 5000 or less, the number input mode is set to "the code number input mode" (S41). The STC is then set to 1 (S42).

Note that "the number input mode" is the mode to determine what kind of number is used as the identification number which is inputted to permit a user to make copies. If "the section number input mode" is set, a section number is used as the identification number; whereas if "the code number input mode" is set, a code number is used as the identification number.

As mentioned above, the code number input mode is set only when the planned number of registered section numbers is 5000 or less to exclude the strong possibility that the same code number is used by more than one section in the case where 5001 or more sections are registered and use 4-digit code numbers.

If the planned number of registered section numbers is judged to have no set limit in S38, the panel image changes to the number input mode switching image shown in FIG. 5 (S43) and the operator is asked to select one of the section number input mode, the code number input mode, and the automatic setting (S44, S46, S48). If the operator touches either the section number key 111 or the code number key 112 in this state, the number input mode is set to either "the section number input mode" or "the code number input mode", respectively. If the operator touches an auto-key, the STC is set to 7 and the processing is transferred to the automatic setting of the number input mode (S45, S47, S50). If the section number input mode or the code number input mode is set, the STC is set to 1 and the system returns to S12.

Figure 16:
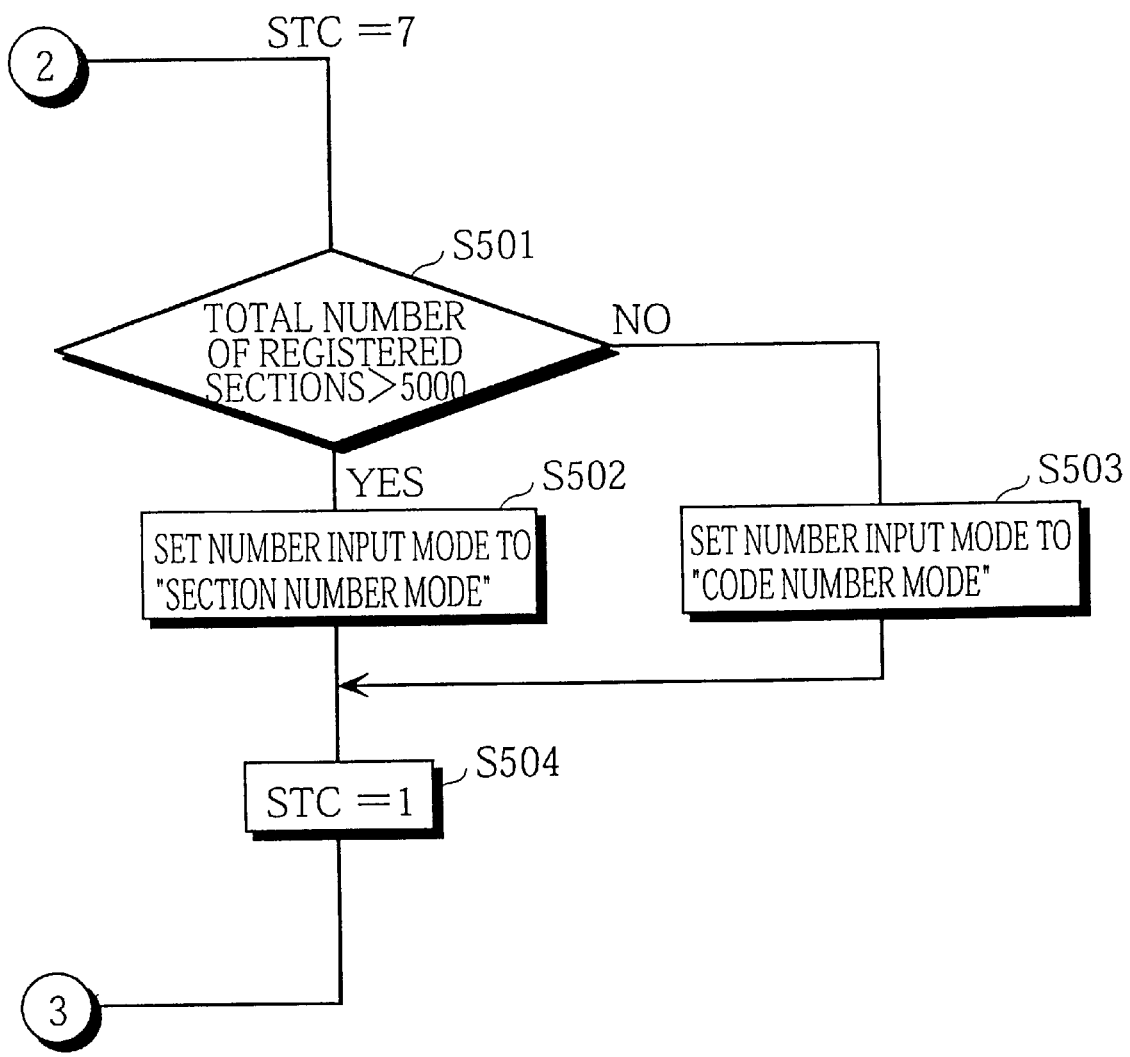

If the auto-key is touched and the STC is set to 7, the processing proceeds to S501 (see FIG. 16). In this case, the planned number of registered section numbers has no set limit so that the number input mode is determined according to the number of sections which have been actually registered. More specifically, if the number of registered sections exceeds 5000 (S501), the number input mode is automatically set to "the section number input mode" (S502); if the number is 5000 or less, the number input mode is automatically set to "the code number input mode" (S503). Then the STC is set to 1 and the system returns to S12.

Figure 13:
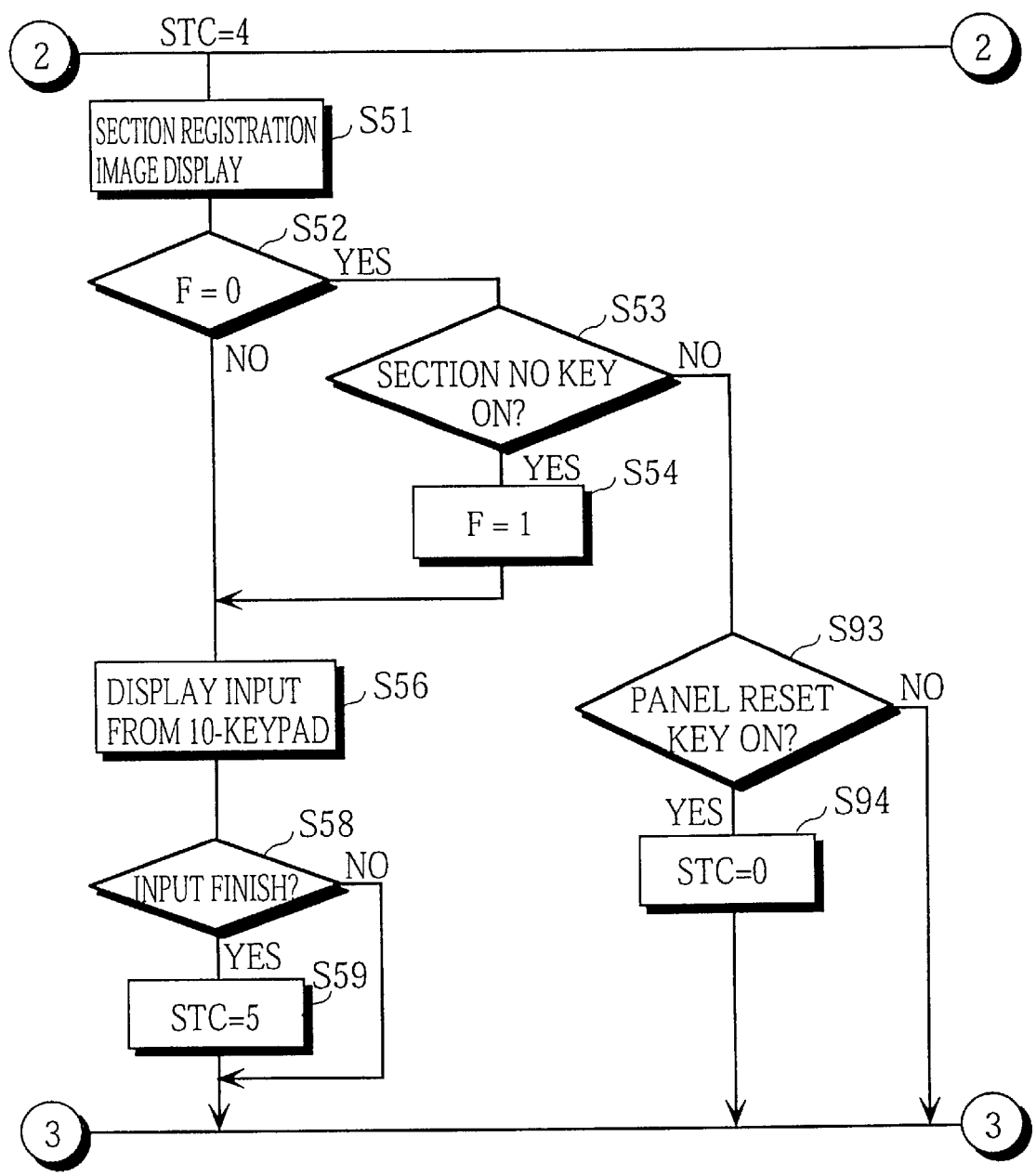

If the section registration key 104 is touched in S26, the STC is set to 4 so that the processing proceeds as S51→S52 (see FIG. 13). In S51, the operation panel image changes to the section registration image shown in FIG. 6. When the section number key in this image is touched (S53), a flag F is set to 1, enabling a section number to be inputted using the 10-keypad.

If the operator inputs a section number which will be registered in this state, the inputted section number is displayed on the display part 116 directly under the section number key 114 (S56). Any number of up to four digits can be inputted as the section number. For instance, in the case where a section number "1" is to be inputted, "1" of the 10-keypad and the ID key are pushed to register the section number "1".

After the completion of the input of a section number (S58), the STC is set to 5 (S59). Until the input of a section number is completed (in other words, until the ID key is pushed), the STC is kept to be 4 so that the processing repeats as S12→S51→S52→S56→S58→S12 and continuous input from the 10-keypad is possible. Therefore, once the section number key is ON and the flag F is set to 1, the processing always proceeds through S52 to S56→S58, ensuring that the input of a section number continues.

Figure 14:
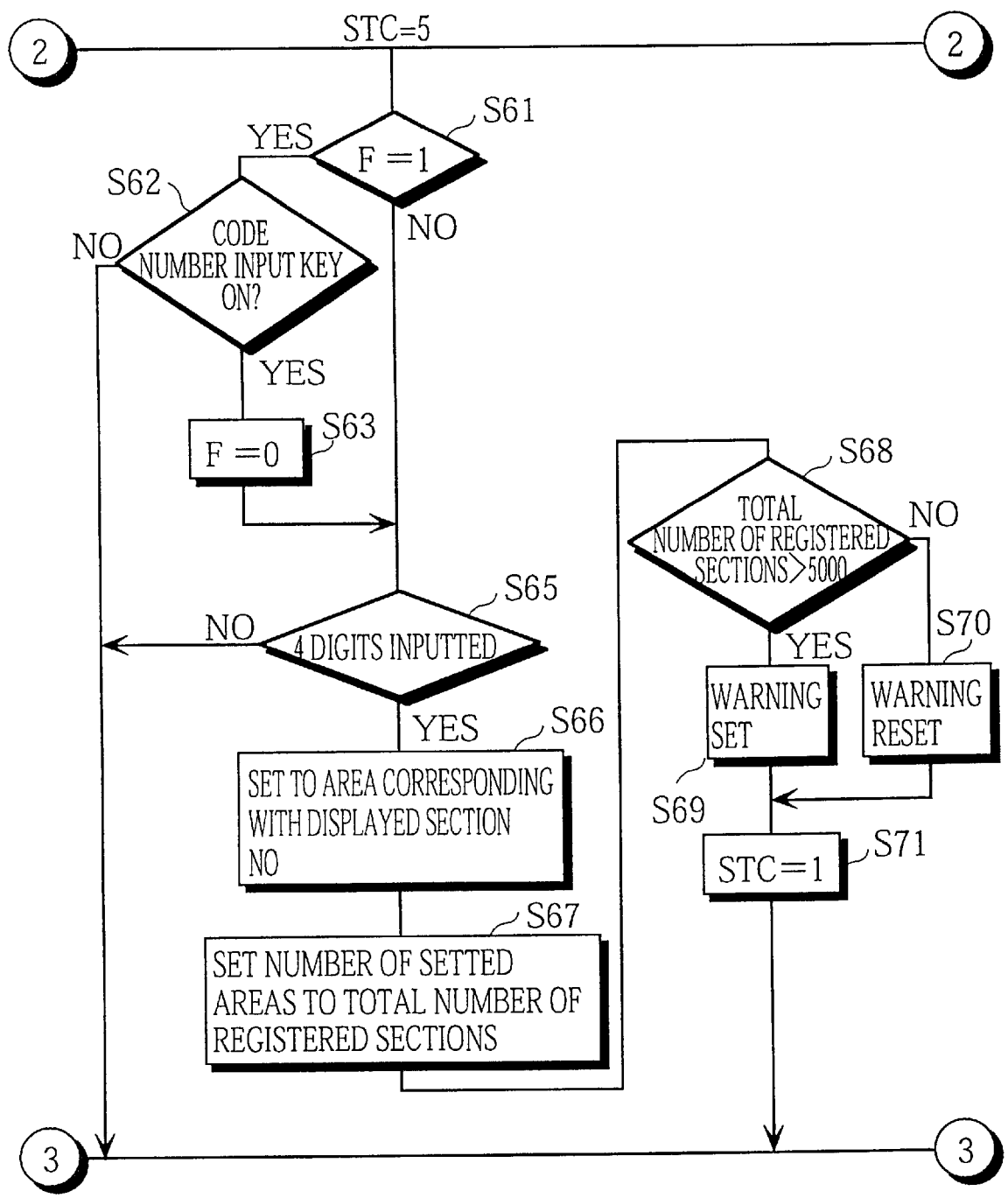

When the input of a section number is completed and the STC is set to 5, the processing proceeds to S61→S62 (see FIG. 14). As clear from the processing in FIG. 13, when the STC is 5, the flag F will definitely be 1 so that the processing will always proceed from S61 to S62. In this state, the operation panel keeps the section number input image. When the code number key 115 in this image is touched (S62), the flag F is reset (S63).

Once the code number key is ON, the flag F is reset so that the processing repeats as S61→S65→S12→S61 until the input of a code number from the 10-keypad is completed. When the operator inputs a 4-digit code number which will be assigned to the displayed section in this state, the inputted code number is displayed on the display unit 117. When the ID key is pushed again, the code number is recorded in an area corresponding to the section number in a monitor table in the memory as shown in FIG. 19 (S66).

Figure 20:
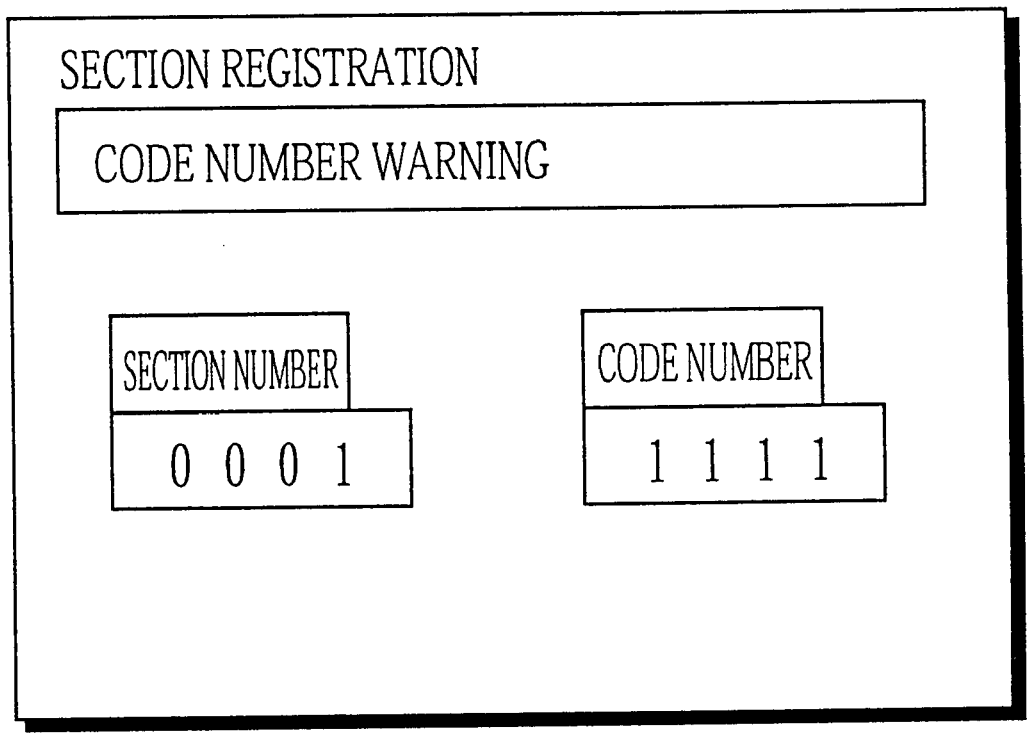
FIG. 20 shows a warning image.

Following this, the number of section numbers which are set in this table is the number of registered sections which is recorded in a predetermined area in the table (S67). In the case where the number of registered sections exceeds 5000, there is a strong possibility that some code numbers are used repeatedly, meaning there will be problems in security. Therefore, a warning is set (S69) and a warning message is displayed on the operation panel. FIG. 20 shows an example of the display image.

On the other hand, if the registered section number is 5000 or less, the warning is reset (S70), with the warning message not being displayed. When the processing of either S69 or S70 is completed, the STC is set to 1 (S71) and the operation panel image returns to the service mode image.

Figure 15:
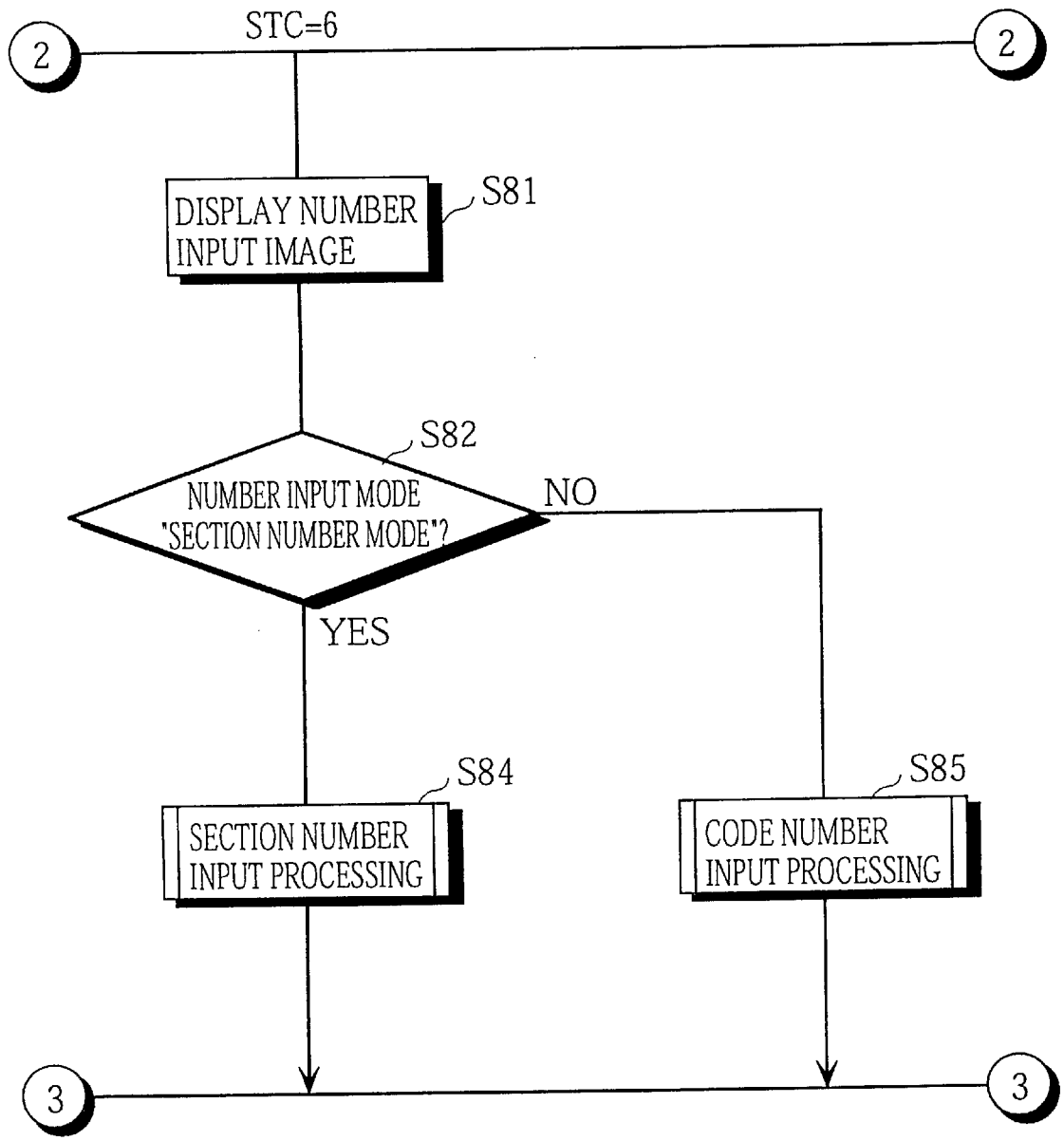

When the number input key 103 is touched in S28, the STC is set to 6 (S29) so that the processing proceeds as S81→S82 (see FIG. 15). This operation is normally performed by an operator who intends to perform a copying operation. In S81, the operation panel image changes to the number input image shown in FIG. 7. Either the section number input processing (S84) or the code number input processing (S85) is performed depending on whether the number input mode is set to "the section number input mode" or "the code number input mode" (S82).

Figure 11:
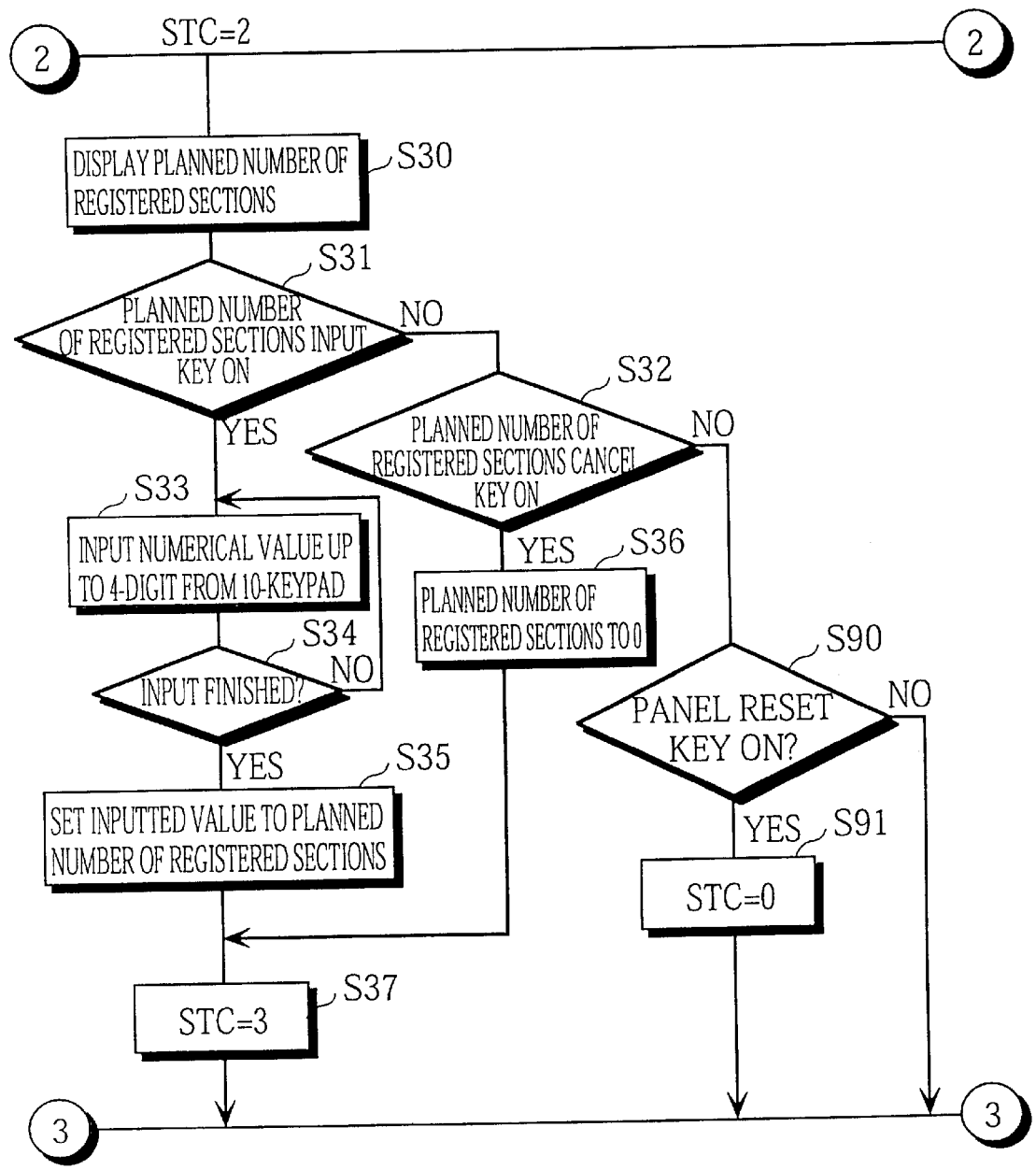
Figure 12:
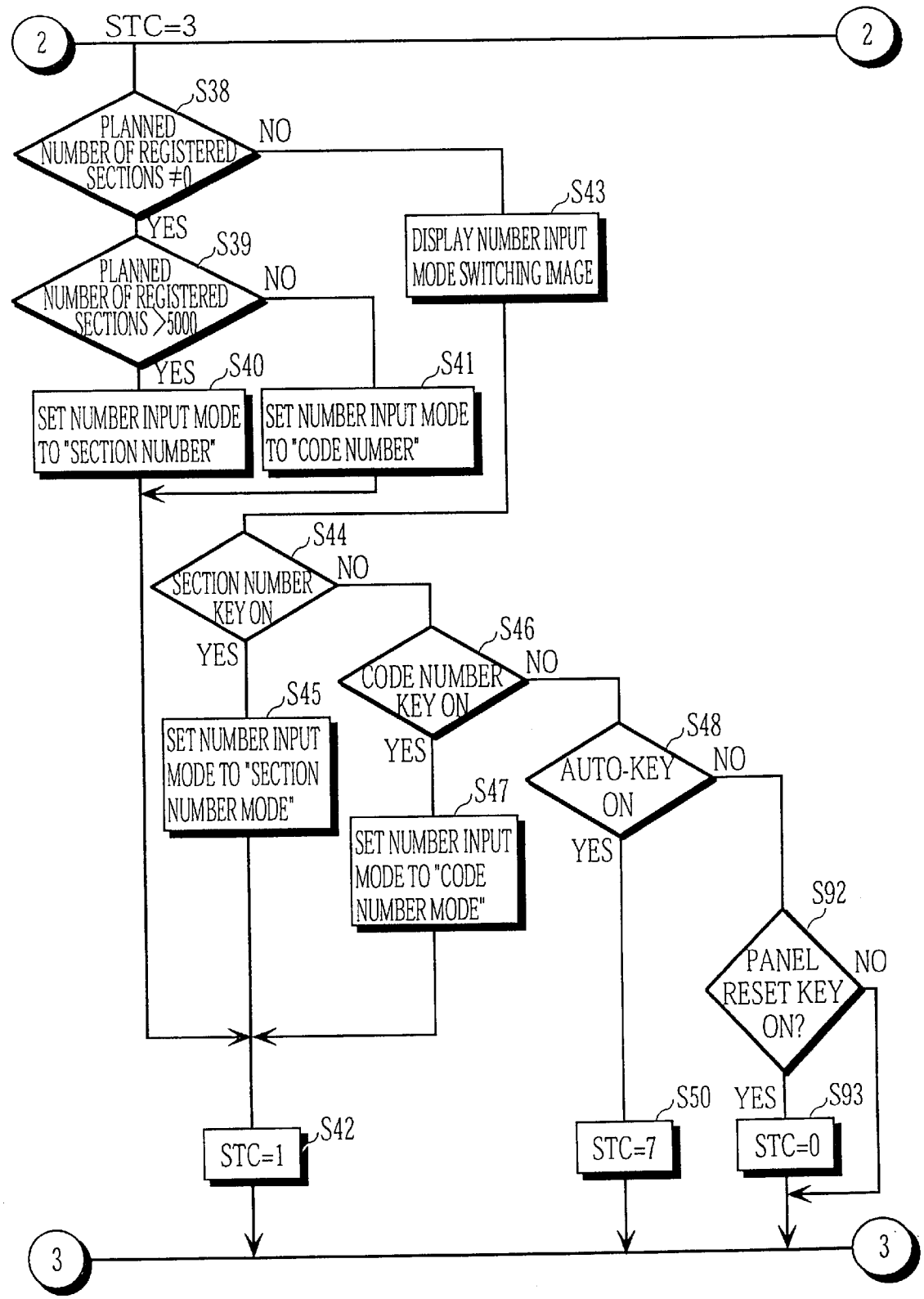

The number input mode is set to "the code number input mode" as an initial value and is changed to "the section number input mode" by the processing shown in FIG. 11. The set mode is judged in S82.

Figure 17:
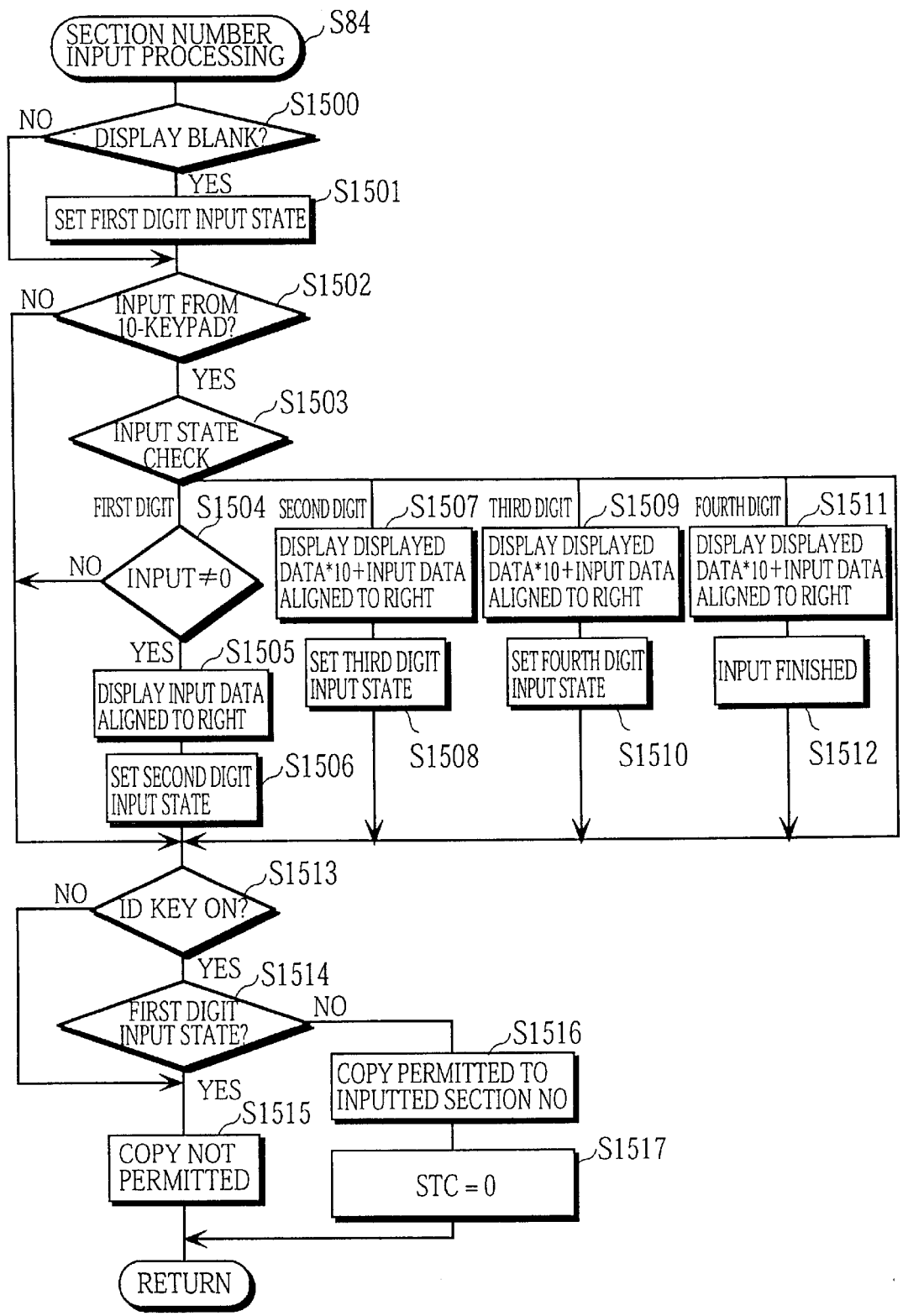
FIG. 17 is a flowchart showing section number input processing.

The subroutine shown in FIG. 17 is executed during the section number input processing in S84. The section number input processing judges whether the number display part 119 in the number input image (FIG. 7) is blank (S1500). When the display part is blank, the system is placed into first digit input state (S1501). In the first digit input state, the value of the key pushed on the 10-keypad 13 is set as the first digit. When a number is inputted from the 10-keypad in this state (S1502), the processing corresponding to the input state is executed.

More specifically, in the first digit input state, it is judged whether the inputted value from the 10-keypad is 0 (S1504). The inputted value, if not 0, is displayed aligned to the right (S1505), with the system being placed into second digit input state. In the second digit input state, the displayed data is multiplied by 10 and is added to a newly-inputted data, with the result being displayed aligned to the right (S1507) and the system being placed into third digit input state (S1508). In the third digit input state, the displayed data is multiplied by 10 and is added to a newly-inputted data, with the result being displayed aligned to the right (S1509) and the system being placed into fourth digit input state (S1510). In the fourth digit input condition, the displayed data is multiplied by 10 and is added to a newly-inputted data, with the result being displayed aligned to the right (S1511) and the input state being terminated without waiting for another key operation (S1512).

While the system is placed into each digit input state, it is judged whether the ID key 97 is pushed in S1513. If the ID key is judged to have been pushed during the first digit input state, a section number will not have been inputted so that copying will not be permitted (S1515). If the first digit input state is not set, copying is permitted by the inputted section number (S1516). Also, the STC is set to 0 and the operation panel image changes to the initial image (S1517).

Figure 21:
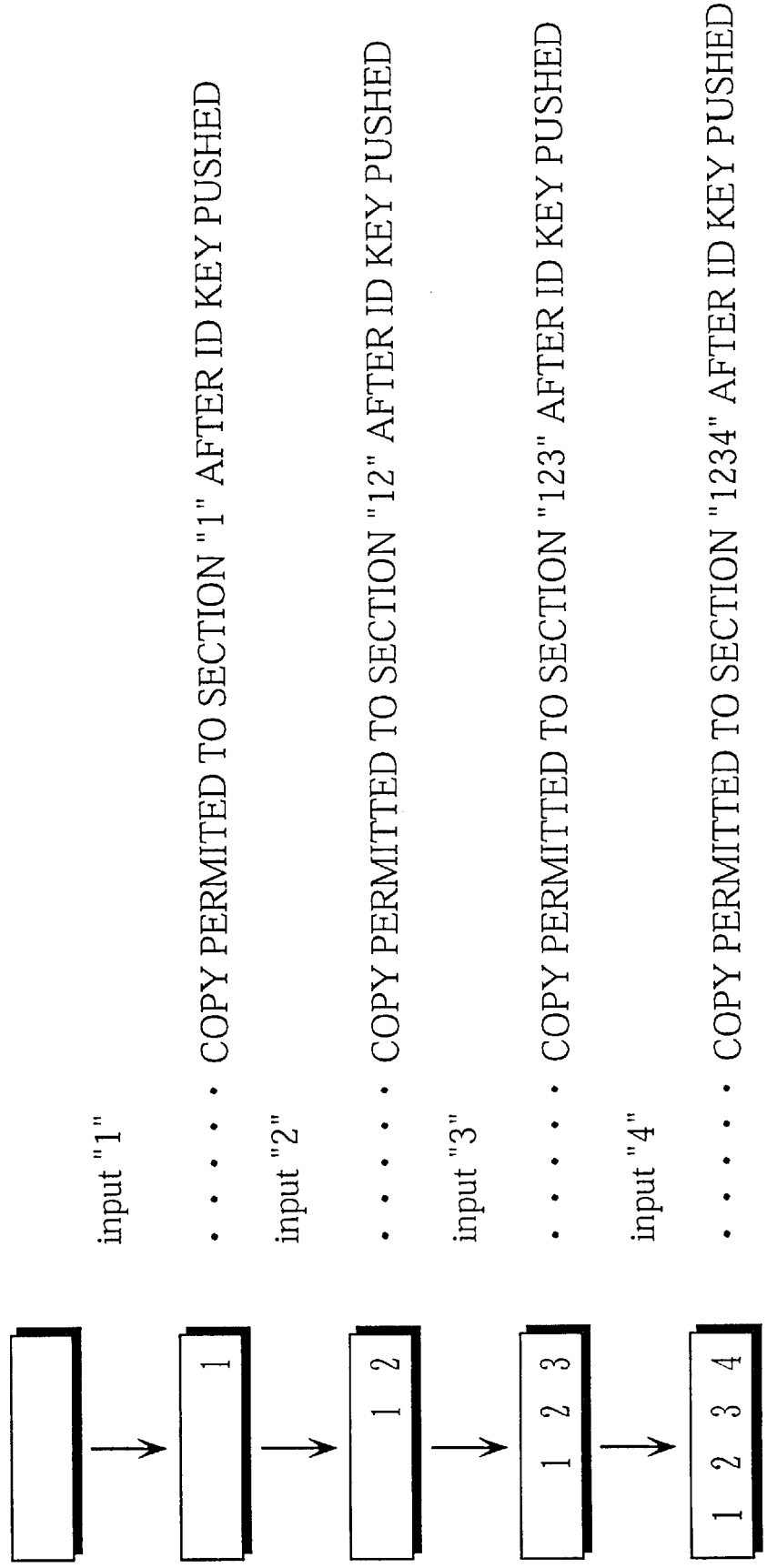
FIG. 21 shows an input process in the section number input mode.

FIG. 21 shows how the content of the number display part 119 changes each time one digit is inputted during the section number input processing. As shown in FIG. 21, during the section number input processing, each inputted number is directly displayed aligned to the right and the already-displayed number is moved one digit to the left. Any time the ID key is pushed, it is judged whether copying is permitted.

Figure 18:
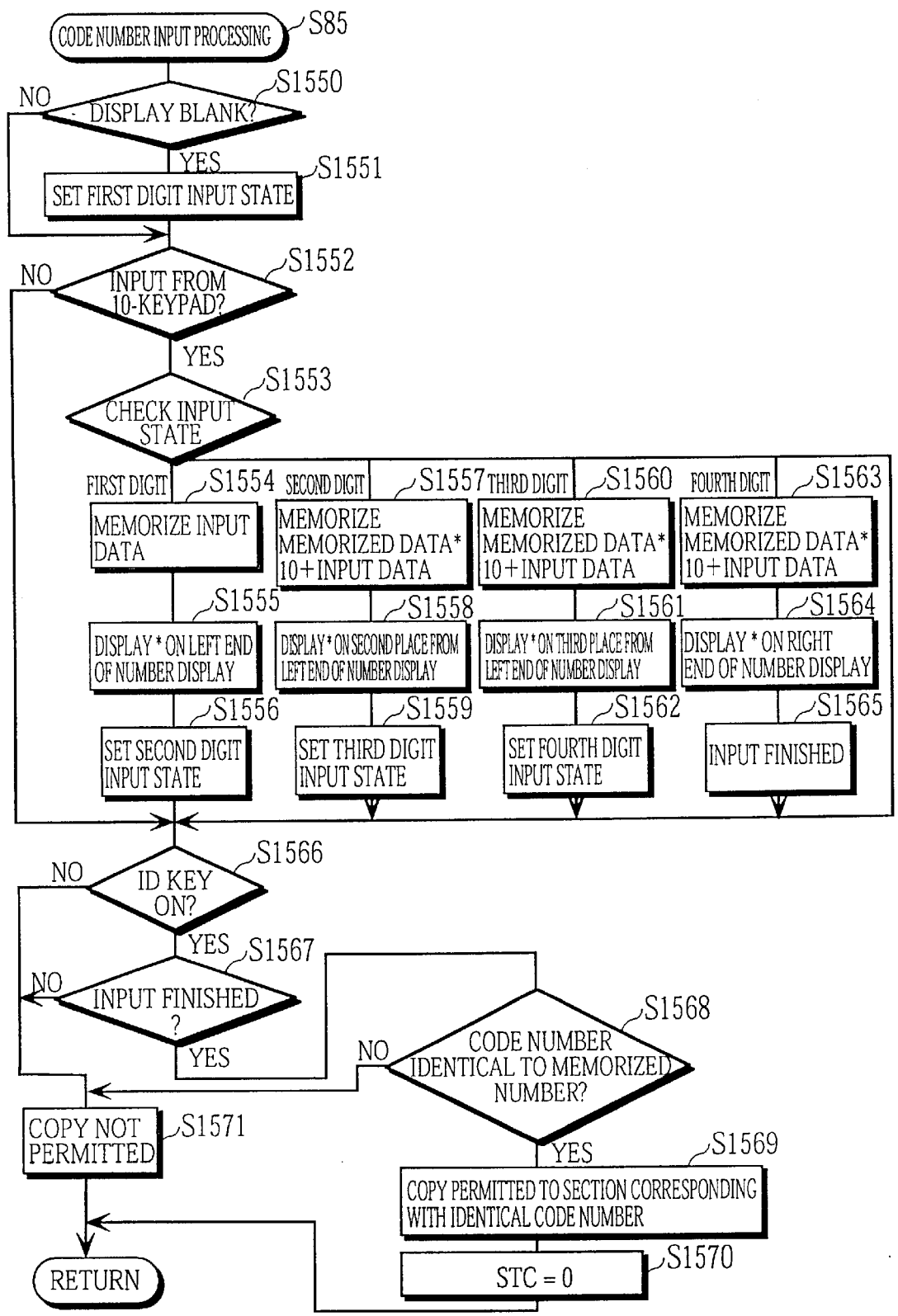
FIG. 18 is a flowchart showing code number input processing.

The subroutine shown in FIG. 18 is executed during the code number input processing in S85. In other words, during the code number input processing, it is judged whether the number display part 119 in the number input image (FIG. 7) is blank (S1550), as in the section number input processing. When the display part 119 is blank, the system is placed into first digit input state (S1551). When a number is inputted from the 10-keypad in this state, the processing corresponding to the input state is executed.

More specifically, in first digit input state, the inputted data is memorized in an internal memory (S1554) and a symbol "*" is displayed at the left end in the display part (S1555) with the system being placed in second digit input state (S1556). In the second digit input state, the memorized data is multiplied by 10 and is added to the newly-inputted data, with the result being rewritten into the internal memory (S1557). Also the symbol "*" is displayed on the second place from the left end in the number display part (S1560) and the system is placed into third digit input state (S1559). In the third digit input state, the memorized data is multiplied by 10 and is added to the newly-inputted data, with the result being rewritten into the internal memory (S1560). Also, the symbol "*" is displayed on the third place from the left end (S1561) and the system is placed in the fourth digit input state (1562). In the fourth digit input state, the memorized data is multiplied by 10 and is added to the newly-inputted data, with the result being rewritten into the memory (S1563). Also, the symbol "*" is displayed on the right end (S1564) and the input state is finished (S1565).

The ID key can be pushed whenever any digit is inputted, although copying is not permitted until all four digits are inputted, unlike the section number input processing in FIG. 17 (S1566, S1567, S1571). When the ID key is pushed after the input is completed, a code number identical to the number memorized in the internal memory is looked up in the registration monitor table. If an identical section is found, the section is permitted to make copies (S1569), with the STC being set to 0 and the image on the display part changing to an usual copy-possible display image (see FIG. 2) (S1570). On the other hand, if no identical section is found, copying is not permitted (S1571).

FIG. 22 shows how the content on the number display part 119 changes each time one digit is inputted during the code number input processing. As shown in FIG. 22, when a number is inputted during the code number input processing, a symbol "*" is displayed instead of the inputted number and the ID key does not activate the judging whether copying is permitted until all digits are inputted.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A display apparatus for a device, which permits the device to operate when a pre-registered identification number is inputted, said display apparatus comprising:
    an input receiving unit for receiving a numerical string;
    a display unit;
    an input mode setting unit for setting a first mode when said input receiving unit receives a numerical string as a first identification number or a second mode when said input receiving unit receives a numerical string as a second identification number; and
    a display controller for not displaying said received numerical string on said display unit when said first mode is set and for displaying said received numerical string on said display unit when said second mode is set.

2. The display apparatus according to claim 1,
    wherein said display controller changes said received numerical string to a plurality of predetermined symbols and has said display unit display said plurality of predetermined symbols when said first mode is set.

3. The display apparatus according to claim 2, wherein said display controller has said display unit display one predetermined symbol aligned in order from a left side to a right side each time said input receiving unit receives one digit when said first mode is set, and
    said display controller has said display unit shift an already-inputted number one digit to the left and display a newly-inputted number each time said input receiving unit receives one digit when said second mode is set.

4. A method of controllably displaying a numerical string on a display unit comprising the steps of:
    setting one of a first display mode and a second display mode for displaying information on said display unit;
    inputting a numerical string; and
    displaying on said display unit said inputted numerical string when said second display mode is set and not displaying said inputted numerical string on said display unit when said first display mode is set.

5. The method according to claim 4,
    wherein said step of displaying comprises the steps of:
    judging which of said first display mode and said second display mode is set;
    changing said inputted numerical string to a plurality of predetermined symbols and displaying on said display unit one predetermined symbol aligned in order from a left side to a right side each time said display unit receives one digit when it is judged that said first display mode is set; and
    shifting an already-inputted number one digit to the left and displaying a newly-inputted number on a right side of said display unit when it is judged that said second display mode is set.

6. A display device comprising:
    an input unit for entering identification code having a plurality of decimal places by sequentially inputting digits one by one;
    a display unit having a plurality of digit display areas for displaying a plurality of digits;
    a selecting unit for selecting a first display mode or a second display mode; and
    a display controller,
        which displays symbols on the display unit from a left-most digit display area to a right-most digit display area synchronously with the digit inputs of said input unit when the first display mode is selected by said selecting unit, and
        which displays a symbol on the right-most digit display area of the display unit with shifting the already-displayed symbol to the left each time the digit is inputted by said input unit when the second display mode is selected by said selecting unit.

7. The display apparatus according to claim 6,
    wherein said displayed symbols are determined regardless of the digit inputted by said input unit for hiding the identification code when the first display mode is selected by said selecting unit, and the displayed symbols correspond with the digits inputted by said input unit for displaying the identification code when the second display mode is selected by said selecting unit.

8. A device which is enabled to operate when a predetermined identification code is inputted, said device comprising:
    an input unit for entering identification code having a plurality of decimal places by sequentially inputting digits one by one;
    an operation controller which permits operations of the device when the predetermined identification code is inputted by said input unit;
    a display unit having a plurality of digit display areas for displaying a plurality of digits;
    a selecting controller for selecting a first display mode or a second display mode; and
    a display controller,
        which displays symbols on the display unit from a left-most digit display area to a right-most digit display area synchronously with the digit inputs of said input unit when the first display mode is selected by said selecting controller, and
        which displays a symbol on the right-most digit display area of the display unit with shifting the already-displayed symbol to the left each time the digit is inputted by said input unit when the second display mode is selected by said selecting controller.

9. The device according to claim 8, wherein said displayed symbols are determined regardless of the digit inputted by said input unit for hiding the inputted identification code when the first display mode is selected by said selecting controller, and wherein the displayed symbols correspond with the digits inputted by said input unit for displaying the inputted identification code when the second display mode is selected by said selecting controller.

10. The device according to claim 8, further comprising a memory which stores predetermined identification codes, wherein said operation controller permits operations of the device when the identification code inputted by said input unit corresponds with any one of said predetermined identification codes stored in said memory.

11. The device according to claim 10, wherein the predetermined identification codes are classified into two types, and wherein said operation controller compares the identification code inputted by the input unit with the predetermined identification codes belonging to one of the types when the first display mode is selected by said selecting controller and compares the identification code inputted by the input unit with the predetermined identification codes belonging to the another types when the second display mode is selected by said selecting controller.

12. The device according to claim 11, further comprising an entry controller for entering digit codes into the memory as the predetermined identification codes, wherein said selecting controller selects the second display mode when a total number of the predetermined identification codes stored in memory exceeds a predetermined number.

13. The device according to claim 11, further comprising:

an entry controller for entering digit codes into the memory as the predetermined identification codes, and a specifying controller for specifying a total number of the predetermined identification codes to be stored in the memory by said controller, wherein said selecting controller selects the second display mode when the total number specified by said specifying controller exceeds a predetermined number.

* * * * *